Oct. 3, 1967     A. H. NEKTON     3,345,071
GAME APPARATUS INCLUDING MEANS FOR PRODUCING A PRINTED RECORD
Filed Sept. 9, 1964     4 Sheets-Sheet 1

INVENTOR.
ARMAS H. NEKTON
BY
Luther W. Hawley
ATTORNEY

Oct. 3, 1967  A. H. NEKTON  3,345,071
GAME APPARATUS INCLUDING MEANS FOR PRODUCING A PRINTED RECORD
Filed Sept. 9, 1964  4 Sheets-Sheet 2
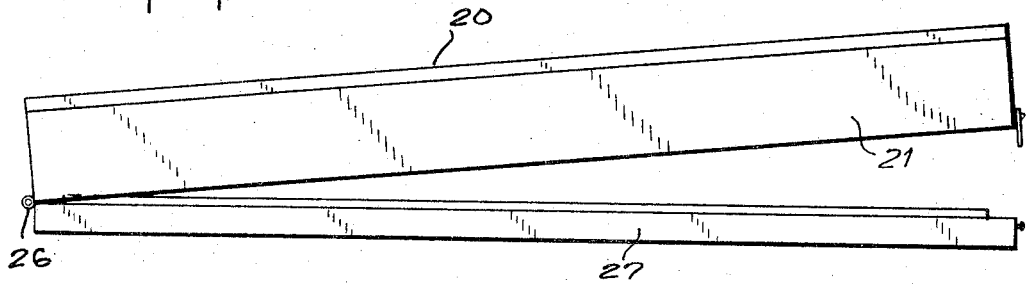
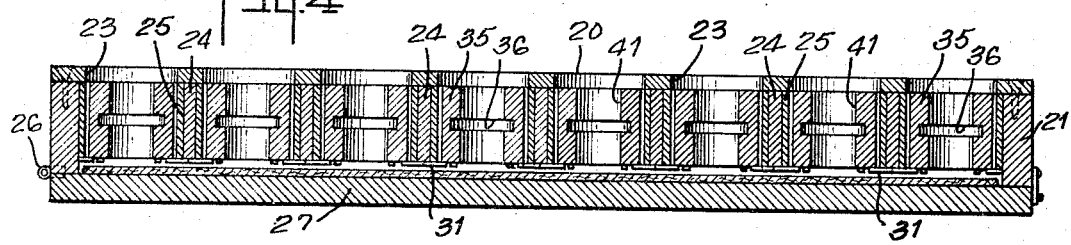
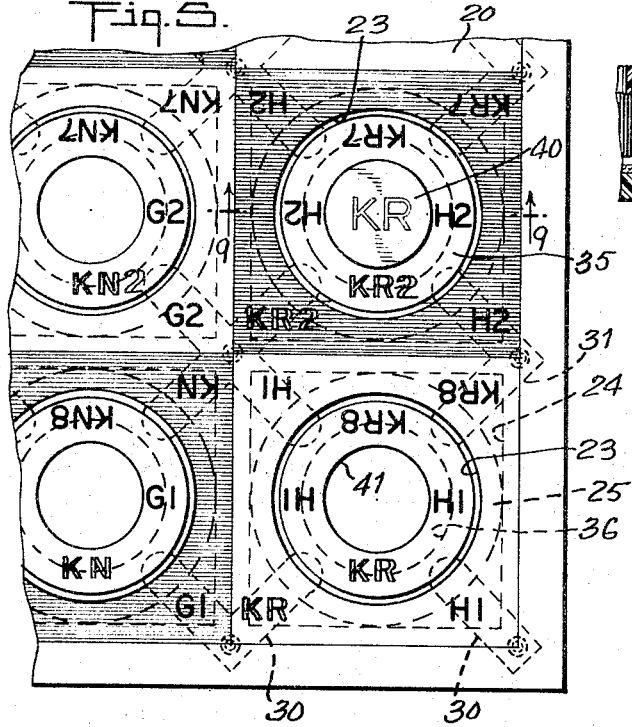
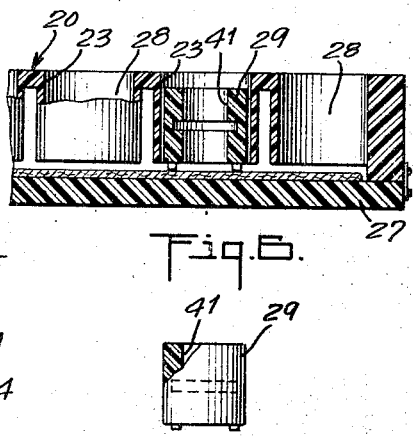
INVENTOR.
ARMAS H. NEKTON
BY
*Luther W. Hawley*
ATTORNEY Oct. 3, 1967  A. H. NEKTON  3,345,071
GAME APPARATUS INCLUDING MEANS FOR PRODUCING A PRINTED RECORD
Filed Sept. 9, 1964  4 Sheets-Sheet 3
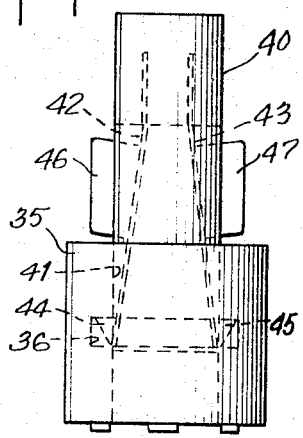
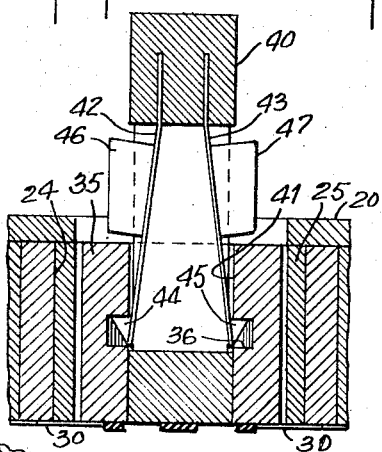
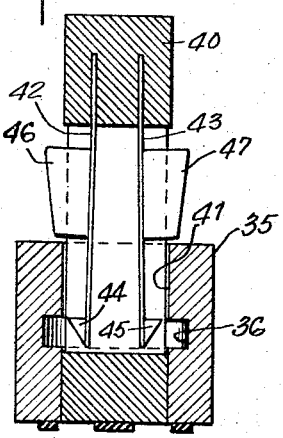
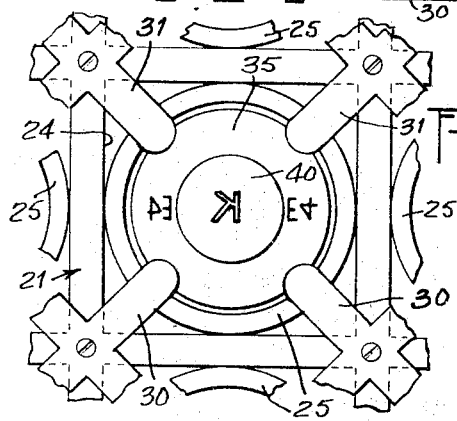
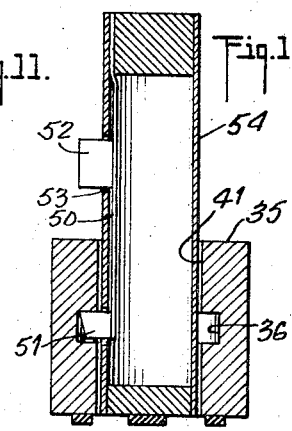
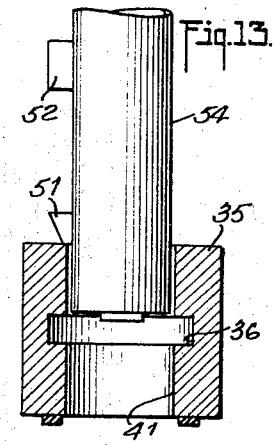
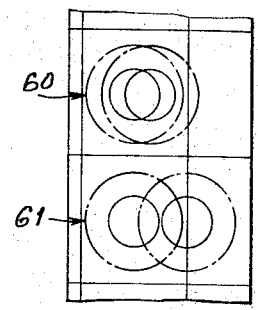
INVENTOR.
ARMAS H. NEKTON
BY
Gunther W. Hawley
ATTORNEY Oct. 3, 1967  A. H. NEKTON  3,345,071
GAME APPARATUS INCLUDING MEANS FOR PRODUCING A PRINTED RECORD
Filed Sept. 9, 1964  4 Sheets-Sheet 4
BLACK
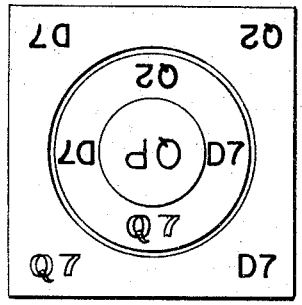
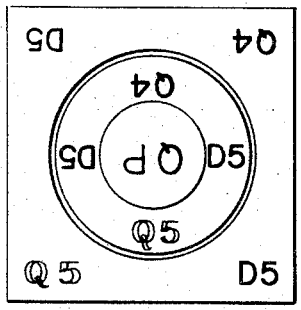
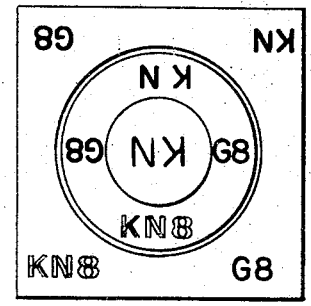
Fig.14.
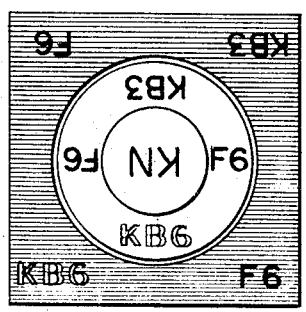
Fig.15.
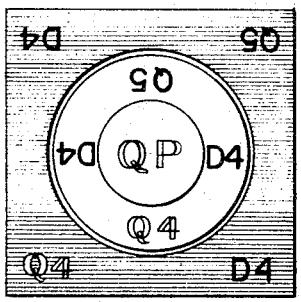
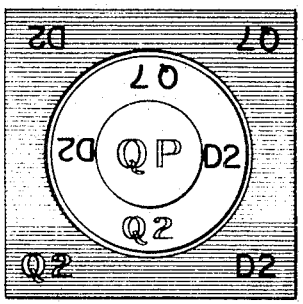
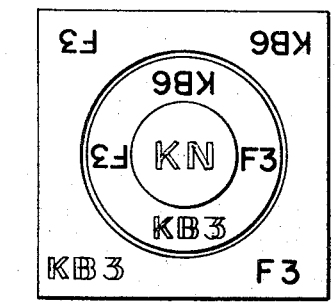
Fig.17.
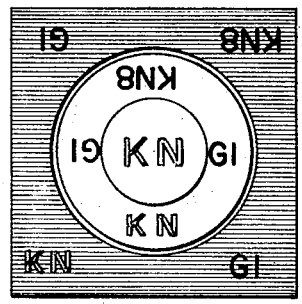
Fig.16.
WHITE
INVENTOR.
ARMAS H. NEKTON
BY
Luther V Hawley
ATTORNEY

United States Patent Office 3,345,071
Patented Oct. 3, 1967

3,345,071
GAME APPARATUS INCLUDING MEANS FOR PRODUCING A PRINTED RECORD
Armas H. Nekton, 32 Sunset Road, Valley Stream, N.Y. 11580
Filed Sept. 9, 1964, Ser. No. 395,125
5 Claims. (Cl. 273—136)

ABSTRACT OF THE DISCLOSURE

Vertical openings are provided in each square of a chessboard, and a collar having printing indicia on the bottom thereof is detachably mounted within each of the vertical openings. The printing indicia on each collar identifies the corresponding square of the chessboard. The collars are hollow and are adapted to receive playing pieces which have printing indicia on the bottom thereof indicating the nature of the playing piece. Latching means are provided to latch the collar and playing piece together temporarily so that they can be removed from the board and jointly stamped on a record sheet to produce a printed record of each move in a chess game while it is in progress. The printing indicia on the bottom of the collars and playing pieces are inked by means of an inking pad located within the chessboard.

---

This invention relates to recording apparatus for games, and particularly to apparatus or mechanism for recording successive moves of the game pieces or men in games such as chess, checkers and the like.

Students of the game of chess frequently find it beneficial to replay and analyze games played by themselves to find fallacies or mistakes made in their play and improve their technique. To do this it is necessary to make a record of the successive plays of the game.

This invention has for its salient object to provide apparatus for easily and accurately recording the move of each game piece as soon as it is made, thus providing an accurate record of the game.

Another object of the invention is to provide apparatus so constructed and arranged that an accurate record can be made of the piece moved and the particular square on the game board to which the piece has been moved.

Further objects of the invention will appear from the following specification taken in connection with the drawings which form a part of this application, and in which:

FIG. 3 is an elevational view similar to FIG. 2 but showing the game board sections opened up;

FIGURE 4 is a transverse sectional elevation taken substantially on line 4—4 of FIGURE 1;

FIG. 5 is a plan view, on an enlarged scale, of a portion of the game board;

FIG. 6 is a sectional view of one corner of the game board showing a modified form of construction;

FIG. 7 is an elevation of the collar shown in FIG. 6;

FIG. 8 is an elevational view showing the playing piece connected to the collar;

FIG. 9 is a sectional elevation of the playing piece and collar shown in FIG. 8;

FIG. 10 is a view similar to FIG. 9 but showing the latch for connecting the playing piece to the collar in retracted position;

FIG. 11 is a bottom plan view of the playing piece and collar;

FIG. 12 is a view similar to FIG. 8 but showing another form of connection between the playing piece and the collar;

FIG. 13 is a sectional elevation similar to FIG. 12 but showing the playing piece disconnected from the collar;

FIG. 14 is a plan view illustrating one move which can be made by the black queen's pawn;

FIG. 15 illustrates a second move which can be made by the black king's knight;

FIG. 16 illustrates one move which can be made by the white queen's pawn;

FIG. 17 illustrates a second move which can be made by the white king's knight;

FIG. 18 is a plan view of the scoring sheet showing a record of the moves made by the black and white playing pieces, as illustrated in FIGS. 14 to 17 inclusive; and FIG. 19 shows in plan a portion of the score sheet on which are illustrated recordings of a checking and a castling move.

Figure 1:
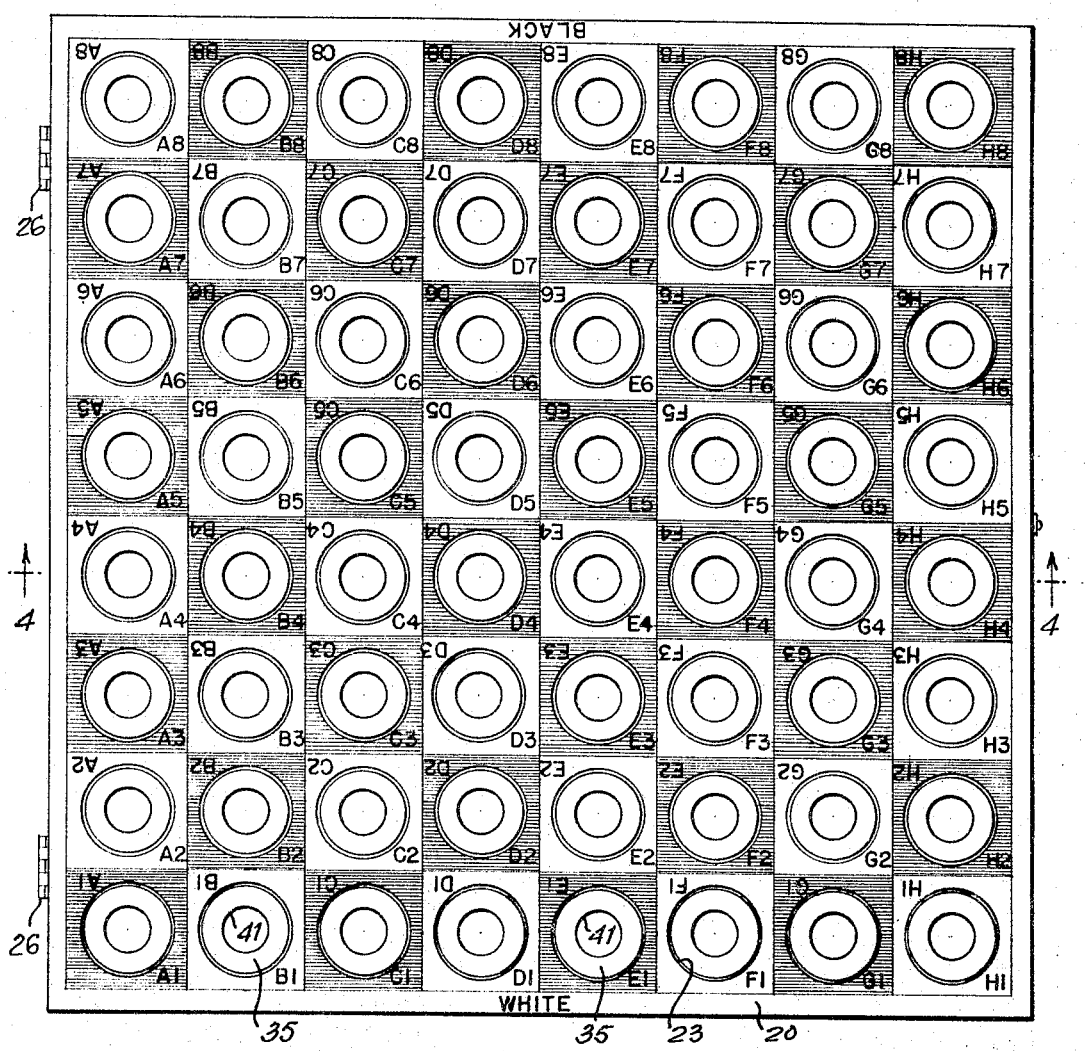
FIG. 1 is a plan view of one form of game board embodying the invention.

In the particular embodiment of the invention illustrated in the drawings there is shown in FIGS. 1 to 5, inclusive, a playing board having a top 20 divided into sixty-four squares for use in playing the game of chess. Each square is identified vertically by the numbers 1–8 and horizontally by the letters A–H, thus square C3 will be the square in the third row upwardly from the bottom of the hinged top or game board and the third square from the left in this row.

Figure 2:
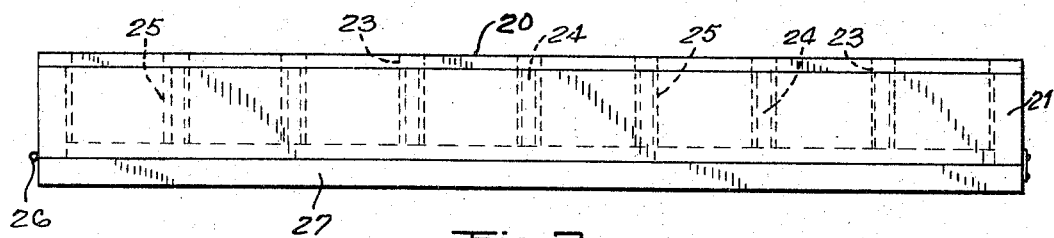
FIG. 2 is an elevational view of the game board shown in FIG. 1.

Each square of the top 20 of the game board has a vertical opening 23 therethrough. The game board has a central portion 21 on which the top is mounted and the central portion has a plurality of square chambers or pockets 24 and into each of these square chambers there is positioned a cylindrical bushing 25. The bushings 25 are vertically aligned with the vertical openings 23 as shown in FIGS. 2 and 4. If desired the bushings 25 may be omitted.

The central portion 21 is hinged at 26 to the bottom 27 of the game board.

Resilient means such as spring strips 30 and 31 may be secured to the bottom on the central portion 21 of the game board and are positioned to overlap the openings through the section 21 as shown in FIGS. 5 and 11.

FIGS. 6 and 7 illustrate a modified form of the game board and in these figures there is shown a game board molded from plastic material with cylindrical pockets 28 and collars 29. If wood or other material of suitable thickness is desired to be used cylindrical sockets therethrough can be centered under the game board squares of a one piece unit.

In FIGS. 8 to 10 there is shown a cylindrical collar 35 having an annular groove 36 intermediate its upper and lower ends. The collar 35 fits into the cylindrical opening or pocket as shown in FIG. 9 and normally rests on the spring strips 30 and 31 as shown particularly in FIGS. 9 and 11.

Each playing piece 40 is adapted to fit into the vertical bore 41 in the collar 35. The playing piece 40 when used in a game of chess has on the top thereof the proper figure to identify the piece as one of the chess men, such as a king's knight, a queen's knight, a king's or queen's pawn, a king, a queen, and so forth.

The playing piece is slotted vertically and has spring strips 42 and 43 on the lower ends of which are mounted latching lugs 44 and 45 and on the upper ends of which are secured outwardly extending projections 46 and 47. These projections extend outwardly through vertical slots in the playing piece 40 and can be pressed inwardly as shown in FIG. 10 to release the latching lugs 44 and 45 from the annular groove 36 in the collar 35. When the piece is latched to the collar 35 as shown in FIGS. 8 and 9 and the playing piece is lifted the collar will also be lifted.

As shown in the bottom plan view in FIG. 11 an indicium such as the letter K, designating a king, is secured on the bottom of the playing piece, and an indicium such as 4E is secured on the bottom of the collar 35. After a play the playing piece and collar are pressed onto an inked pad, such as shown attached to the top of member 27 in FIGS 4 and 6, or other inking mechanism and are lifted out of the pocket and the playing piece and collar are then pressed onto a sheet of paper and make a record of the play just made, namely, the king has just been moved to space 4E on the playing board. After the record has been made the playing piece and collar are then replaced in the space on the playing board designated 4E. If desired a separate inking pad may be provided, i.e., an inking pad which is not a part of the chessboard assembly, and the playing piece and collar may be depressed into engagement therewith.

It should be noted that spring strips 30 and 31 do not interfere with the above-described inking operation, since the spring strips engage their respective collars above the level of the printing indicia, as shown in FIG. 9.

In FIGS. 12 and 13 the playing piece has a vertically mounted spring strip 50 which has a latching lug 51 at the lower end thereof, engageable in the groove 36 of the collar 35. The spring strip is manipulated by means of a projecting lug 52 which extends through an opening 53 in the vertical wall of the playing piece 54.

As stated at the outset in the specification, this invention has for its object to provide apparatus for easily and accurately recording the move of each game piece as soon as it is made, thus providing an accurate record of the game. In other words, a record is made of the piece moved and the particular square on the game board to which the piece has been moved.

Although the invention is simple, FIGS. 14 to 19 inclusive have been added to the drawings to illustrate the invention in connection with chess markings.

FIGS. 14 and 15 show two moves which can be made by the black queen's pawn and king's knight as the first moves of the game. In Fig 14 the black queen's pawn is moved from the square designated D7 on the game board as shown in FIG. 1 to the square designated D5.

In FIG. 15 the black king's knight is moved from the square designated G8 to the square designated F6.

In FIG. 16 the white queen's pawn is moved from the square designated D2 to the square designated D4.

In FIG. 17 the white king's knight is moved from the square designated G1 to the square designated F3.

FIGS. 14 to 17 show the indicia on each square designating the square in a chess game. Similar indicia are carried on the bottoms of the collars and playing pieces. Several different chess notation systems are shown in FIGS. 14 to 18. FIG. 18 shows the present American and and International notations. FIG. 16 shows the American and International notations along with the old German notation.

Similar chess game indicia are shown on the squares in FIG. 5 and also on the record or score sheet in FIG. 18. This figure records the plays shown in FIGS. 14 to 17 inclusive, the moves of the white playing pieces being shown at the left and those of the black playing pieces being shown at the right.

FIG. 19 illustrates at 60 the manner of indicating on the score sheet a check or checking. This is done simply by stamping overlapping records of the play.

In FIG. 19 there is illustrated at 61 a manner of recording a castleing move which is done by a wider overlapping of the stamped record of the play.

From the illustrations in FIGS. 14 to 17 and in FIG. 5 it will be seen that each square has marked thereon the position of the square relative to the black playing pieces and also to the white playing pieces.

From the foregoing specification it will be evident that simple and practical means have been provided for easily and expeditiously recording each play as it is made, thus making a record of the playing piece moved and the square on the game board to which the piece has been moved. Attention is called to the fact that since the playing piece and the collar are disposed in a pocket the board can be tilted without dislodging the playing pieces and if desired a game can be played with the board so tilted. Also, as indicated in FIGS. 2 through 4, the member 27 may be joined to member 21 by a hinge 26 to provide easy access to the ink pad mounted on top of member 27. The hinge 26 permits the tilting of the member 21 with reference to the member 27.

Although certain specific embodiments of the invention have been particularly shown and described, it should be understood that the invention is capable of further modifications and that changes in the arrangement and in the construction of the various parts may be made without departing from the spirit and scope of the invention as expressed in the following claims.

I claim:

1. Apparatus for recording successive plays in a game such as chess or checkers comprising a playing board having squares marked thereon, each square having a vertical opening therethrough, a plurality of collars each vertically movable into and out of one of said openings, a playing piece detachably connectable to any of said collars and movable into the collar to a position in which the bottoms of the collar and playing piece will be disposed substantially in the same plane, printing indicia on the bottom of the playing piece identifying the piece, and printing indicia on the bottom of the collar identifying the square in which it is located.

2. Apparatus for recording successive plays in a game such as chess or checkers comprising a playing board having squares marked thereon, each square having a vertical opening therethrough, a plurality of collars each vertically movable into and out of one of said openings, a playing piece detachably connectable to any of said collars and movable into the collar to a position in which the bottoms of the collar and playing piece will be disposed substantially in the same plane, printing indicia on the bottom of the playing piece identifying the piece printing indicia on the bottom of the collar identifying the square in which it is located, and means for detachably latching the playing piece to the collar in said position, said latching means including manual means on said playing pieces for releasing said latching means.

3. Apparatus for recording successive plays in a game such as chess or checkers comprising a playing board having squares marked thereon, each square having a vertical opening therethrough, a plurality of collars each vertically movable into and out of one of said openings, a playing piece detachably connectable to any one of said collars and movable into the collar to a position in which the bottoms of the collar and playing piece will be disposed in substantially the same plane, printing indicia on the bottom of the playing piece identifying the piece, printing indicia on the bottom of the collar identifying the square in which it is located, and resilient means engageable with the bottom of the collars for holding the collars and game pieces mounted therein in fixed positions, but yieldable to allow the collars and playing pieces to be moved downwardly into engagement with inking means therebelow.

4. Game board recording apparatus comprising a game board having squares marked thereon, a pocket below each square, an opening through each of said squares, a member in each pocket insertable and removable through one of the openings and having on the bottom thereof printing indicia identifying the particular location of the square with which it is associated, and at least one playing piece mountable in any one of said members and detachably connectable thereto and having on the bottom thereof printing indicia identifying the piece, the playing piece and removable member being so positioned with respect to each other as to permit inking of the printing indicia on the bottoms thereof.

5. Game board recording apparatus comprising a game board having squares marked thereon, a pocket below each square, an opening through each of said squares, a member in each pocket insertable and removable through one of the openings and having on the bottom thereof printing indicia identifying the particular location of the square with which it is associated, at least one playing piece mountable in any one of said members and detachably connectable thereto and having on the bottom thereof printing indicia identifying the piece, an ink pad mounted below each pocket, and resilient means for normally holding the bottoms of each member and playing piece above and out of contact with the ink pad, but yieldable to allow them to be moved into engagement with the ink pad.

References Cited

FOREIGN PATENTS 765,850 3/1934 France.
482,398 10/1929 Germany.

DELBERT B. LOWE, *Primary Examiner.*